United States Patent [19]

Scholten et al.

[11] 4,228,261
[45] Oct. 14, 1980

[54] SUPPORTED CHROMIUM-OXIDE POLYMERIZATION CATALYST HAVING A POROUS SILICA SUPPORT USED IN THE POLYMERIZATION OF OLEFINES

[75] Inventors: Joseph J. F. Scholten, Sittard; Lambertus J. M. A. van de Leemput, Echt, both of Netherlands

[73] Assignee: Stamicarbon, B.V., Geleen, Netherlands

[21] Appl. No.: 32,638

[22] Filed: Apr. 23, 1979

Related U.S. Application Data

[62] Division of Ser. No. 924,742, Jul. 14, 1978.

[30] Foreign Application Priority Data

Jul. 18, 1977 [NL] Netherlands .......................... 7707960

[51] Int. Cl.$^2$ ............................ C08F 4/02; C08F 4/24
[52] U.S. Cl. ..................................... 526/106; 252/451; 252/458; 423/335; 423/336; 423/337; 423/338; 526/906; 526/908

[58] Field of Search ......................................... 526/106

[56] References Cited

U.S. PATENT DOCUMENTS

| | | | |
|---|---|---|---|
| 3,132,125 | 5/1964 | Schwander et al. | 526/908 |
| 3,239,498 | 3/1966 | Witt | 526/352 |
| 3,819,598 | 6/1974 | Galiano et al. | 526/352 |

*Primary Examiner*—Stanford M. Levin
*Attorney, Agent, or Firm*—Cushman, Darby & Cushman

[57] ABSTRACT

Process for the preparation of a porous, pure silica which is particularly suitable as a catalyst support for a chromium-oxide catalyst used in polymerizing of olefins. The process comprises the steps of converting a silicon-halogen compound to a silica and then admixing with water to form a silica gel. The gel is then dried and ground to a predetermined particle size. The silica can then be made into a catalyst by placing on the support a chromium compound and then heating in a non-reducing atmosphere.

2 Claims, No Drawings

SUPPORTED CHROMIUM-OXIDE POLYMERIZATION CATALYST HAVING A POROUS SILICA SUPPORT USED IN THE POLYMERIZATION OF OLEFINES

This is a division of application Ser. No. 924,747 filed July 14, 1978.

This invention relates to a process for preparing a porous, pure silica that is particularly suitable as a catalyst support, and to a process for preparing catalysts comprised of the steps of depositing a chromium compound on such a silica and then heating the combination in a non-reducing atmosphere.

BACKGROUND OF THE INVENTION

The preparation of silica is usually done by either of two methods. According to one method, silica is prepared by converting a silica-hydrogel precipitate, that is then washed and dried. Products prepared in accordance with a method of this type are usually called silica gels and are mainly used as adsorbents and as catalyst supports. In order to be able to meet some of the various criteria for catalyst supports, a great many different embodiments of this type of process have been proposed and described, e.g., in Netherlands Pat. Application Nos. 69.11999 and 69.12002, German Patent Application No. 2,411,735, Canadian Patent Specification No. 967,936, and U.S. Pat. Nos. 2,700,061; 2,731,326; 2,763,533; 2,765,242; 2,785,051; 3,428,425; 3,433,593 and 3,453,077.

For some other uses, such as fillers, reinforcing agents, thickeners, and the like, silica is prepared by flame hydrolysis of silicon-halogen compounds, i.e., conversion of these compounds with a combustible hydrogen-containing gas.

The particle size of silica prepared by flame hydrolysis is considerably smaller than that of the silica gel. A silica prepared by flame hydrolysis consists of primary particles ranging from a few millimicrons to at most a few dozens millimicrons. These primary particles usually agglomerate into bigger, so-called secondary particles, the particle size of which usually range from about 1 to about 10 microns.

The particle size of the silica gels can readily be controlled, and these gels can also be prepared in the form of granules or small lumps.

According to a well-known method for preparing polyolefins, notably polythene, an α-olefin, e.g., ethene, is polymerized with the aid of catalysts based on chromium dioxide on a support such as, silica. Catalysts of this type are prepared by impregnating the support with a solution of chromium oxide, a compound that can be converted into chromium oxide, or a composition containing chromium oxide, drying the impregnated support and activating the catalyst composition by heating it at temperatures between about 400° C. and about 1000° C. in a non-reducing atmosphere such as, an inert atmosphere like nitrogen or carbon monoxide, or in an oxidizing atmosphere preferably air. Catalysts of this type are sometimes referred to as Phillips-type catalysts. These supported chromium-oxide catalysts may be used as such, but organometallic compounds may also be added.

The most practical method of activating the catalyst composition is by heating in a fluidized bed. Such a method, however, can be used only if the silica support has a given minimum particle size, as otherwise a considerable part of the supported catalyst will be blown out of the fluidized bed causing major dust problems. For this reason, silica prepared by flame hydrolysis which has a small particle size is not desirable as a catalyst support. In order to be able to heat the supported catalyst in a fluidized bed at temperatures between about 400° and about 1000° C., the particles must have not only a minimum particle size, but also must have sufficient strength to withstand the strong abrasive forces in the fluidized bed reactor. Otherwise, strong abrasion and pulverization will occur in the fluidized bed forming large fractions of fine particles which cause dust problems and which are not suitable as particles of supported catalyst.

It has also been discovered that the support must meet certain other requirements in order to produce a catalyst which obtains high yields of polyolefins with good product properties. One of these requirements is that the silica support must have a given porosity, which must be retained as much as possible when the support is heated. In this regard, the content of impurities, notably the sodium content, was discovered to be of critical importance. When this content is high, the pore volume decreases when the silica is heated, in some cases the pore volume has decreased to very low values of no more than a few tenths of cm$^3$/g. This decrease in pore volume has an unfavorable effect on the activity of the catalyst. Even if the pore volume decrease is comparatively small, if there is too high of a sodium content, the activity of chromium oxide and similar catalysts will still be low. The cause of this decrease in activity of the catalyst is not yet clear. One suggestion in that crystallization phenomena play a part, but this is still an open question.

A drawback of many Phillips-type catalysts is that the melt index of the polyethylene to be produced can be controlled effectively only by means of the polymerization reactor temperature. Because the sensitivity of these catalysts to hydrogen as a molecular-weight regulator is slight, large amounts of hydrogen are generally used to regulate the molecular weight.

For producing polyethylene with comparatively high melt indices, the solution process is suitable, i.e., polymerization is effected at temperatures of at least about 110° C. and a solution of polyethylene in the solvent used, e.g., gasoline, is obtained. The problem with the solution process is that it is more expensive than the suspension process. This is because the polymerization in the suspension process is effected at a lower temperature, generally about 65° C. to about 85° C.

Phillips-type catalysts, and notably supports for these catalysts now exist for the preparation of polyethylene with comparatively high melt indices by polymerization in a suspension process. However, the preparation of supports for catalysts of this type has been cumbersome and time-consuming. Sodiumsilicate solution is used as a starting material and silica is made to precipitate from it by means of an acid, usually sulphuric acid. The supports must be thoroughly free of sodium, therefore, washing for prolonged periods is required to obtain the desired low sodium concentrations. As a result of this cumbersome process, the cost of making these supports has been high. Up until now, other suggestions for supports or catalysts for the preparation of polyethylene with comparatively high melt indices of polyethylene with comparatively high melt indices in a suspension process have so far given few, if any, results.

It has now been discovered that chromium-oxide catalysts on a silica support prepared according to the present invention are highly sensitive to hydrogen and that they allow the preparation of a polyethylene of any desired melt index by the suspension process.

The catalyst on support, and hence the support, must have a given minimum particle size, because in addition to reasons discussed above, the particle size of the support also affects the particle size of the polymer. During transport, trans-shipment and processing, a fine polymer with small particle sizes causes dust problems that become more serious as the particle size of the polymer become smaller. Therefore, the support must have an average particle size of at least about 10μ, preferably, at least about 40μ, and even more prefeably, at least about 80μ.

The powder properties of the polymer are such that it is desirable that the particle-size distribution of the polymer be in a narrow range, i.e., the particle size distribution factor according to Rosin-Rammler must be at least 2. In addition to the dust problem discussed above, the particle size distribution also affect the flowing and handling properties of the material, i.e., the ability of being able to move the material from container to container during shipment and further processing. In order to obtain polymer powders of this type, the particle size distribution factor of the support must also be at least 2. The determination of the average particle size and particle-size distribution can be done by a sieve analysis. The results of the sieve analysis can the be plotted in a double logarithmic-logarithmic Rosin-Rammler diagram. The point on the curve corresponding to a sieve residue of 36.8% indicates the average particle size. The gradient of the curve is a measure of the width of the particle-size distribution. The steeper the gradient, the greater the particle size distribution factor and the narrower the particle-size distribution. Particles which are too coarse are also not too desirable. The average particle size is preferably at most about 250μ, and, even more preferable, at most about 200μ, at a particle size distribution factor of at least 2 and, preferably at least 3.

OBJECTS OF THE INVENTION

While silica gels prepared by precipitation from sodium silicate can generally be made to meet the demands of particle size and particle size distribution, a sufficiently low sodium content can only be achieved by cumbersome and time-consuming methods.

Therefore, it is an object of the present invention to provide an economic process by which a silica with all the aforementioned advantages as a catalyst support can be prepared.

In particular, the process of the present invention will produce a silica that is suitable as a support for catalysts of the chromium-oxide type for the polymerization of olefins, especially ethylene. Another object of the invention is to provide catalysts of the chromium-oxide on silica type, by means of which polyolefins, in particular polyethylene, with excellent processing properties can be obtained at high yields.

DESCRIPTION OF THE INVENTION

The objects of the present invention can be achieved by preparing a silica with (1) an average particle size of at least about 10μ, preferably at least about 40μ, and even more prefeably, at least about 80μ, (2) a pore volume of at least about 1.0 cm$^3$/g, preferably at least about 1.5 cm$^3$/g, and even more preferably, at least about 1.8 cm$^3$/g, and (3) a sodium content of at most about 200 ppm (parts by weight per million), preferably at most about 150 ppm.

It has now been discovered that a silica with an average particle size of at least about 10μ, a pore volume of at least about 1.0 cm$^3$/g, and a sodium content of at most about 200 ppm can be prepared by taking a silica obtained by converting a silicon-halogen compound with a combustible hydrogen-containing gas admixing at least an equal amount of water to form a gel, drying this gel at a temperature between about 200° C. and about 1000° C., and then grinding it to the desired particle size of at least about 10μ. Preferably, the gel is ground to a particle size of at least about 40μ, and, even more preferably at least about 80μ. The average particle size is preferably at most, about 250μ, and even more preferably, at most about 200μ.

The present invention makes it possible to prepare a considerably coarser silica while retaining the extremely low sodium content which is characteristic of silica prepared by flame hydrolysis. Although the preparation of silica gel is usually less expensive than the preparation of silica by flame hydrolysis of silica-halogen compounds, this is not true when preparing silica gels with low sodium contents. Hence, the present invention not only offers the advantage that high-grade supports for catalysts of the chromium oxide type for the polymerization of olefins can be prepared, but it is also attractive economically. While the use of silicas prepared in accordance with the present invention is not restricted to supports for catalysts of chromium-oxide type, this is its best commercial utilization.

Silica prepared by flame hydrolysis can be converted to a gel with water in various ways. The silica may be admixed or ground with water. Then the mixture is preferably allowed to stand for a predetermined time, usually for at least several hours. Considerably longer aging periods ranging from days to several months may also have a favorable effect on the formation of the gel. The admixing or grinding with water may not only be effected under pressure both at ambient temperatures and at elevated temperatures of up to about 100° C., but also at higher temperatures of up to e.g., about 300° C. Also, supercritical conditions may be used.

The amount of water is at least about 50% by weight per weight of silica plus water. Concentrations between about 10% to about 25% by weight of silica calculated to the total amount of mixture are very suitable, i.e., use is made of a triple to tenfold weight of water relative to the silica. Larger amounts of water may be used, but are uneconomical because of the drying which is required.

Also, agglomeration aids, such as ammonia, sodium hydroxide or other bases, may be added to the gel. If sodium hydroxide is used, the amounts employed must be low enough so that the sodium content of the support increases by less than about 100 ppm. When heated, the silica gels appear to be more sensitive to sodium which had been added than to sodium which was already present. Hence, ammonia is preferably used as an agglomeration aid.

The use of an agglomeration aid in the preparation of the gel gives mechanically stronger granules, which means that the gel can be heated to lower temperatures.

After being dried and heated, the silica gel must be ground to the desired particle size. If the temperature of heating has not been high enough, very fine silica gel will form during grinding. Apparently, this is caused by a low mechanical strength. Although, the very fine material may be removed by sieving, when a catalyst is applied on such a silica gel, especially when the supported catalyst is heated to temperatures between about 400° C. and about 1000° C. in a fluidized bed, serious pulverization occurs caused by the low mechanical strength. Thus, a fine material is formed again and a catalyst on a support with a wide particle-size distribution is obtained. This is highly undesirable for the powder properties of the polymer prepared with such a catalyst.

It has been found that the silica gel has to be heated higher than a predetermined temperature which varies depending upon conditions in order to obtain sufficient mechanical strength. This temperature can easily be determined experimentally for any given conditions. It will be about 800° C. or higher if no agglomeration aids are added. Heating to such high temperatures of over 800° C. gradually reduces the silica gel's adsorbent power for a catalyst to be applied to it. The amount of silanol groups, which are deemed responsible for the adhesion of the catalyst to the support, decreases. However, heating to about 900° C., will not cause a serious strong reduction in adsorbent power, and hence, this temperature can be used, but higher temperatures become correspondingly less desirable.

When agglomeration aids are added, it is found that the required heating temperature is sometimes reduced to between about 200° C. to about 300° C. This occurs particularly when alkali metal hydroxides are added. Therefore the amounts thereof must be kept low.

Catalysts of the chromium-oxide type on a support for the polymerization of olefin are prepared by placing a chromium compound, e.g., as a solution on the support, after which the impregnated support is activated by heating in a non-reducing atmosphere, usually air. The activation temperatures are often about 900° C. and, hence, a suitable support must be able to stand such temperatures without damage. It is of special importance that the pore volume does not or only very slightly changes upon heating to about 900° C. The supports of the present invention meet these requirements.

An additional special advantage of the present process is that the silica gels prepared in accordance with this invention can be fractioned by sieving, and a sieving fraction with a very narrow particle-size distribution can be used as a catalyst support. Coarser fractions can be ground further, while finer fractions can be reprocessed into a gel.

EXAMPLES

The present invention will be further elucidated by the following Examples.

EXAMPLE 1

100 g of Aerosil 130 V were ground with 400 ml of water in a ball mill for 2 hours. Aerosil 130 V is put on the market by Degussa and is a silica prepared by flame hydrolysis and having a specific area of 130 m$^2$/g and an average size of the secondary particles of 6μ. The 20% gel was dried at about 200° C. for 20 hours, broken into coarse lumps, and part of it was then heated at about 900° C. for 6 hours. The fraction heated at no more than about 200° C. and the fraction heated at about 900° C. were ground. Large amounts of fine material was soon formed in the former fraction. The latter fraction gave a product that could be sieved. The pore volume of the fraction heated at about 200° C. measured by the mercury-penetration method was 1.5 cm$^3$/g, that of the fraction heated at about 900° C. was 1.52 cm$^3$/g.

EXAMPLE 2

100 g of Aerosil 130 V were ground with 400 ml of water in a ball mill for 2 hours. The pH was then changed from 2.8 to 4.5 by addition of a 0.025 N sodium hydroxide solution. The gel was heated at about 200° C. for 20 hours and then ground. The mechanical strength was found to be excellent, and the silica gel could be ground into a product that can be sieved and which contains little fine material. The sodium content was 100 ppm. The pore volume was 1.34 cm$^3$/g. After 6 hours heating at about 900° C., the pore volume was 1.22 cm$^3$/g.

EXAMPLE 3

In the process of Example 2, the pH of the gel was adjusted to 4.5 by addition of ammonia solution. After 20 hours heating at about 200° C., a product was obtained that can be ground. The sodium content was less than 5 ppm. The pore volume was 1.44 cm$^3$/g. After 6 hours heating at about 900° C., the pore volume did not change and was still 1.44 cm$^3$/g. Also, the pore size distribution appeared to be the same before and after heating at about 900° C.

What is claimed is:

1. In a process for polymerizing olefines, the improvement consisting of using as the polymerization catalyst, a supported chromium-oxide catalyst having as the support a porous, pure silica with a pore volume of at least about 1.0 cm$^3$/gram and a sodium content of at most about 200 ppm prepared by the process comprising the steps of
   (a) admixing to a non-porous silica prepared by the flame hydrolysis of a silicon-halogen compound at least about 50% by weight of water per weight of water plus silica,
   (b) forming a silica gel from said admixture of non-porous silica and water,
   (c) heating said gel at a temperature between about 200° C. to about 1000° C. to dry the gel,
   (d) grinding the dried silica to a particle size of at least about 10 microns to form a catalyst support,
   (e) placing a chromium compound on said support, and
   (f) heating the supported chromium compound in a non-reducing atmosphere to form a supported chromium-oxide catalyst.

2. Process of claim 1, wherein the olefin being polymerized is ethylene.

* * * * *